Patented June 18, 1946

2,402,167

UNITED STATES PATENT OFFICE 2,402,167

PHYSICAL FORM OF ORGANIC PIGMENT

Joseph William Lang, Woodstown, N. J., and Stanley Rawlings Detrick, Wilmington, Del., assignors to E. I. du Pont de Nemours & Company, Wilmington, Del., a corporation of Delaware No Drawing. Application December 24, 1942, Serial No. 470,072

8 Claims. (Cl. 260—314.5)

This invention relates to the production of organic pigments in a finely divided solid form having improved valuable properties, as more fully defined below.

It is an object of this invention to convert organic pigments into a finely divided aqueous pulp characterized by its capacity of being dried without producing hard agglomerates. It is a further object of this invention to produce organic pigments in a finely divided dry form characterized by quick dispersibility in oily media and by producing an oily suspension or paste of high tinctorial qualities. A still further object of this invention is to provide a process for preparing highly concentrated aqueous pastes from vat dyestuffs, phthalocyanines, and other water-insoluble dyestuffs which are otherwise difficult of dispersion to produce a concentrated paste. A still further object of this invention is to provide a process for subdividing organic pigments, which is characterized by simplicity and high economy. Other and further important objects of this invention will appear as the description proceeds.

The physical form of pigments that will produce maximum strength and brilliance together with other desirable properties has been the subject of investigation for many years. Among the methods now in use to obtain the optimum particle size are: Dry and wet grinding, controlled precipitation, and acid pasting. In general, controlled precipitation and acid pasting are the methods used with organic pigments. When an attempt is made to develop full strength of organic pigments by grinding them in the absence of diluents, weak and dull shades are produced in most cases.

In certain cases it has been suggested to reduce the particle size of the pigment in question by grinding the same with large amounts of inert, water-insoluble, solid diluents. The diluent in these cases generally stays in the pigment, and the process is therefore limited to the production of pigments of low color content.

It has also been suggested to bring pigments into a state of fine dispersion by grinding them in the presence of water-soluble salts, such as sodium chloride, followed by washing to leach out the water-soluble salt. However, in spite of numerous references in the art to a process of this nature, it has not found such practical application heretofore, and numerous other attempts, involving the use of dispersing agents, fatty acids, and similar assistants which coat the pigment particles or otherwise remain in the pigment as a foreign body, point to the conclusion that the process of grinding with water-soluble solids has not met with commercial success. The reason for this failure appears to reside in the fact that as a general proposition, that is, by following the procedures implied or prescribed in conjunction with this process in the prior art, grinding with water-soluble solids followed by extraction with water does not give any better results than the process of "acid-pasting." In other words, the resulting pastes do not possess the property of drying without caking and the dry powders eventually obtained are not "softer" or easier to disperse in oily vehicles than dry powders resulting from pigment pastes obtained in the acid-pasting process.

Now we have found that by subjecting pigments to a grinding process in the presence of water-soluble, solid diluents and by observing certain special details of procedure as more fully set forth hereinbelow, it is possible to convert even the hardest-grinding pigments into soft powders of unusual qualities, chief among which is the ability to disperse into oily media with relatively little mechanical working, producing, when thus incorporated, printing inks, paints or lacquers of tinctorial strength equal to and often superior to that obtained by the flushing-process from the corresponding acid-pasted pigments.

"Acid-pasting" in the above paragraph and throughout this specification refers to the process of producing an aqueous paste of a pigment by dissolving the same in concentrated sulfuric acid, diluting with water, and filtering off and washing the resulting fine precipitate. The "flushing process" consists of direct transfer of pigment from an aqueous paste into the desired oily medium, and because it involves no intermediate drying and grinding steps, it is generally considered by the industry as the standard of comparison for obtaining paints or lacquers of maximum tinctorial qualities.

Our novel milling process enables us further to produce aqueous suspensions of the finely divided pigments of exceptional characteristics, chief among which is the ability to be filtered to produce a highly concentrated filter cake of high tinctorial qualities without adding dispersing agents to the aqueous suspension, and the ability to be dried directly into a powder without producing hard agglomerates.

Another advantage is that in the case of certain colors which are synthesized by fusing their intermediates in the presence of water-soluble, solid diluents, as for instance in the case of copper phthalocyanine which is often synthesized by melting together phthalonitrile, cuprous chloride and sodium chloride, the color need not be isolated from the diluent but may be subjected in crude form, that is jointly with the water-soluble diluent, to treatment according to this invention, with resultant economy in materials and handling.

The said special conditions of our grinding process hereinabove referred to consist essentially of selecting first of all a suitable salt:pigment ratio, the term salt here being employed as a generic term for any water-soluble, inert, crystalline substance employable for this purpose; for instance, true chemical salts, urea or sugar. Secondly, our improved process demands the employment of a particular type of apparatus. Thirdly, the length of grinding is controlled with respect to the salt:pigment ratio selected and with respect to the speed and size of apparatus employed. Finally, the process is further subjected to certain special controls, for instance the avoidance of customary grinding assistants or aids.

Considering first the apparatus, we have found that the grinding of pigments with water-soluble, crystalline substances is successful only if the apparatus is of the attrition type, that is, designed to produce grinding by attrition and shearing as distinguished from impact. Practical examples of such apparatus are the ball mill, the roller mill, and the edge runner. The pulverizer and the micronizer, on the other hand, are examples of mills that are not suitable for this process. The influence of the apparatus by itself is a factor which was not to be foreseen from anything within the experience of the art.

Equally important is the selection of the salt: pigment ratio. In the case of most pigments, including vat dyes and phthalocyanine colors, the highest degree of tinctorial strength was not obtained unless the weight of the water-soluble, crystalline diluent or salt was at least four times the weight of the pigment employed.

Larger salt:pigment ratios are permissible, and in fact beneficial; for we have found that the time required for continuous grinding to bring out the full tinctorial strength of the ultimate pigment varies in inverse order as the salt:pigment ratio. The larger the salt:pigment ratio, the less time is required for grinding. Salt:pigment ratios as high as 20:1 have been employed by us in some experiments. Higher ratios have been tested and found permissible, except, of course, that they cease to be economical.

Of course, the exact time required for grinding will depend also on the size and speed of the apparatus employed. For best results on a commercial scale, it is naturally contemplated that plant-size apparatus will be employed, say a ball-mill several feet in diameter. The speed then, likewise, is to be selected at the optimum found in general practice for plant-scale use of such apparatus. This optimum is at 65–75% of the critical speed.

The critical speed of a ball mill is defined as that speed at which a ball in contact with the shell would be subjected to a centrifugal force equal to the force of gravity. The general formula for computing this speed is $$S_c = \frac{76.6}{\sqrt{D-d}}$$

wherein $S_c$=the critical speed in revolutions per minute.
$D$=the internal diameter of the mill in feet.
$d$=the diameter of a single ball in feet.

In most cases, $d$ is small compared to $D$ and may be neglected.

Now, in practical runs, using ball mills varying from 28″ diam. at 38 R. P. M. to 96″ diam. at 18 R. P. M., and adhering in each instance to a salt:pigment ratio of 4:1, we have found that in the case of phthalocyanine colors and common salt as diluent, pigment of maximum tinctorial strength may be obtained in 24 to 40 hours. With vat dyes and common salt, a milling time of 16 to 32 hours was found sufficient. With phthalocyanine colors, but using a salt:pigment ratio of 9:1 in a rubber-lined mill of 36″ diam. and at 35 R. P. M., good results were obtained in 16 hours. It is not recommended to extend the grinding periods considerably beyond those above indicated.

For further understanding of our invention, the following examples are given, which illustrate our preferred mode of operation without any intent, however, to limit the invention thereto. Parts mentioned are by weight.

*Example 1*

Twenty lbs. of crude copper phthalocyanine (dry; prepared according to Example 3 of B. P. 410,814) were mixed with 80 lbs. of sodium chloride in a steel ball mill of 28″ diam., containing 1000 lbs. of steel cyl. pebs. The charge was milled at 38 R. P. M. for 40 hours and discharged. The bright blue powder thus obtained was extracted with 400 lbs. of water, containing 2 lbs. of sulfuric acid and heated to 95°–100° C. The pigment was removed by filtration, the press cake washed free of acid and inorganic salts. Its solids content at this stage was 26% by weight. When this product was dried at 60° C., a soft, bright blue powder was obtained which was much stronger and brighter than resulted when the same copper phthalocyanine was ground in the same mill without the use of salt. The product was also very jet in masstone, brighter, and 15% stronger than the same copper phthalocyanine when acid pasted as described in B. P. 410,814 or U. S. P. 2,065,928 and converted to a soft-textured powder according to the process described in U. S. P. 2,138,049. A surprising feature of this process is the physical condition of the pigment, which permits drying the filter cake, without further treatment, to a soft-textured powder. The rate of strength development of this powder is far superior to the powders obtained by special finishing methods of the prior art. Thus, the pigment obtained by the present invention, when mixed with litho-varnish, develops its full strength after two passes over a three-roll ink mill. The best powders produced by methods of the prior art require at least six passes to develop full strength.

This same, deflocculated, physical condition of the pigment permits the standardization of high-solids aqueous pastes without the use of wetting or dispersing agents. High solids pastes are desirable for two reasons, (1) greater ease of "flushing" of the pigment from an aqueous system into ink and paint vehicles, and (2) lower costs of shipping. The ability to standardize pastes without the use of aqueous dispersing agents has several advantages; namely "flushing" of the pigment can be accomplished more completely, and lakes produced from these pastes dry with a softer texture than where a water-dispersing agent is present. The solids content of the press cake in the above example was found to be 26%. This is much higher than is possible to obtain by washing and filtering under similar conditions a paste of copper phthalocyanine precipitated by the acid-pasting procedure. On the other hand, if the press cake obtained in this example is diluted with water to about 20% solids, a freely flowing paste is obtained.

As another test of the fine state of subdivision of the above product we have subjected a sample of it to study by the aid of an electron-microscope under a final magnification of 42,000:1. In the resulting photograph, the particles were found to be of indefinite, roughly rounded, but certainly non-crystalline outline, and the largest particles had a diameter not greater than 40 millimicrons.

*Example 2*

An intimate mixture of phthalonitrile (415 parts), sodium chloride (400 parts), and cuprous chloride (85 parts) was prepared by milling the components for several hours in a suitable apparatus. 900 parts of this premix were heated to 190° C. in an enamel tray heated by an oil bath. After one hour the reaction was complete and the product was cooled and coarsely ground by means of a hammer mill or micro pulverizer. This crude reaction mass contained approximately 50% of copper phthalocyanine.

Forty parts of this crude copper phthalocyanine were mixed with sufficient additional sodium chloride (60 parts) to give a total salt:pigment ratio of 4:1 in a steel ball mill as described in Example 1 above. The charge was milled for 40 hours, discharged and extracted with water containing sulfuric acid as described in Example 1.

The bright blue powder obtained by drying the product at 60° C. was very similar in strength, brightness, and jetness of masstone to the pigment obtained by salt-grinding copper phthalocyanine crude from which the inorganic and organic impurities had been removed by aqueous extraction prior to salt grinding.

*Example 3*

An intimate premix of phthalonitrile (150 parts), sodium chloride (150 parts), and cupric chloride (60 parts) was prepared as above and baked for 2 hours at 200° C. in a rotary iron baker of the type described in U. S. P. 2,153,300. Forty parts of the crude reaction mass, containing approximately 20 parts of monochloro-copper-phthalocyanine, were transferred from the baker into a ball mill as described in Example 1 above, and milled after the addition of 60 parts of sodium chloride. At the end of the grinding period, the charge was extracted with water containing 0.5% sulfuric acid and dried, giving a bright blue monochloro-copper-phthalocyanine powder. When tested for use in printing inks, it was found to be somewhat stronger, greener, and brighter in pigment shade as compared with monochloro-copper-phthalocyanine finished by known acid pasting methods.

In the above Examples 2 and 3, other water-soluble inert salts such as sulfates, chlorides, or phosphates of the alkali metal salts may be used as diluents in the baking step for the pigment formation, and the crude reaction mass from the baker may be used directly as starting material for our now finishing process with satisfactory results. It is surprising, but fully confirmed by experimental results, that the residual organic impurities from the baking reaction do not cause dullness of the finished pigment as obtained by this salt milling process.

*Example 4*

Ten parts of a highly chlorinated copper phthalocyanine (prepared according to B. P. 478,256) were mixed with 40 parts of sodium chloride in a rubber-lined ball mill (36" diam.) containing 500 parts of steel cyl. pebs. The charge was ground at 32 R. P. M. for 82 hours, samples being taken at various intervals in order to follow the course of the grinding. Each sample was extracted with water containing a small quantity of hydrochloric acid, filtered, and washed free of inorganic salts. The nutsch cakes thus obtained were finished by three different methods, (1) by direct drying, (2) by a special deflocculating procedure as described in our earlier U. S. Patent No. 2,305,379, and (3) by direct flushing of the nutsch cake into litho-varnish. All samples were given six passes over a three-roll ink mill and compared with a sample of acid pasted, chlorinated copper phthalocyanine treated by the flushing method. The results showed excellent tinctorial properties for all samples taken after 24 hours grinding, with the optimum at about 32 to 42 hours grinding.

*Example 5*

Twenty parts of crude lead phthalocyanine (prepared according to U. S. P. 2,056,944) were mixed with 80 parts of salt and ground in a rubber-lined ball mill following the procedure described in Example 1. A bright green powder was obtained which was extracted with 1000 parts of 20% ammonium acetate solution to remove the salt and any lead oxide remaining in the crude lead phthalocyanine. The extracted pigment was dried at 60° C. When ground in nitro-cellulose lacquer, the pigment gave a bright yellowish-green shade of excellent strength. The strength was far superior to the same pigment ground in a ball mill in the absence of a diluent. This pigment was particularly interesting since this was the only method found to date by which the true shade and strength of lead phthalocyanine could be ascertained.

*Example 6*

Twenty parts of magnesium phthalocyanine (prepared according to the method described in U. S. P. 2,202,632) were extracted with 400 parts of 1% to 2% hydrochloric acid at 90 to 95° C. Magnesium atoms were removed from the molecule by means of this extraction. The pigment was dried, mixed with 80 parts of sodium chloride, and milled according to the description given in Example 1. The charge was filtered, washed free of inorganic salts and the press cake dried at 60° C. The pigment obtained was superior in tinctorial properties to that obtained by methods of the prior art.

*Example 7*

A series of experiments were carried out by milling in a similar manner, in a ball mill, mixtures of crude copper phthalocyanine with 19 times its weight of water-soluble diluents selected from the following group:

Anhydrous sodium sulfate;
Hydrated sodium sulfate ($Na_2SO_4.10H_2O$);
Sodium carbonate;
Hydrated trisodium phosphate ($Na_3PO_4.12H_2O$);
Hydrated magnesium sulfate ($MgSO_4.7H_2O$);
Sugar.

At the end of this grinding period, in each case, the blue powder was discharged from the mill and extracted with water containing 0.5 to 1.0% of sulfuric acid, followed by drying of the extracted pigment at 95 to 100° C. Soft powders of bright blue appearance were obtained in each case. When tested for use in printing inks, all samples were found to be far superior in the rate of strength development, and stronger and superior in shade, as compared with a control sample prepared from the same crude copper phthalocyanine by the acid pasting method described in U. S. P. 2,065,928 and followed by a soft powder treatment according to the method described in U. S. P. 2,138,049.

*Example 8*

Eighty-four parts of copper phthalocyanine and 16 parts of dichloro-iso-dibenzanthrone were mixed with 900 parts of sodium chloride and ground in a ball mill as described in Example 1. The charge was extracted in a similar manner, filtered, washed free of inorganic salts and the filter cake converted to an alumina-hydrate lake. This sample was compared with an alumina-hydrate lake prepared from acid-pasted samples of the same pigments, mixed in the same ratio. The product of this example was redder and 10% stronger than the one derived from the acid-pasted pigments.

The above example illustrates the general use of our invention for shading one pigment with another, and demonstrates that where the shading pigment is more expensive than the principal pigment, or tends to dull the shade of the resulting mixture, our improved process enables one to cut down considerably on the proportion of the shading component.

*Example 9*

Ten parts of 3:10-diethoxy-triphenyl-dioxazine (prepared as disclosed in U. S. P. 1,065,063) were mixed with 90 parts of sodium chloride and ground in a ball mill according to the procedure described in Example 1. The charge was extracted with 400 parts of water at 60° C., filtered, washed free of inorganic salts and dried at 60° C. This powder was ground in litho-varnish on an ink mill and compared with an ink similarly prepared from a sample of the same pigment that had not been ground with salt.

The product of this example was extremely brilliant, much redder in shade, and about 400% stronger than the pigment as obtained by the methods of the prior art. This pigment is an outstanding example of the value of the milling procedure of this invention when applied to colored compounds for which no method of dispersion had heretofore been available.

*Example 10*

Twenty parts of crude Sulfanthrene Red 3B (Color Index #1212) were mixed with 80 parts of sodium chloride and ground in the same ball mill and at the same speed as in Example 1 for 28 to 32 hours. The charge was removed from the mill and extracted with 400 parts of water at 25 to 30° C. The charge was filtered, washed free of inorganic salts, and dried at 90° C. A brilliant, bluish-red powder was obtained, which when incorporated into lacquer was judged darker in masstone, redder and much brighter, and 25% stronger than the product obtained from the usual acid pasting procedure of the prior art.

*Example 11*

Five parts of 3:3'-dibromo-indanthrone and 45 parts of dry sodium chloride were charged into a rubber-lined mill (36" diam.) together with 500 parts of cyl. pebs. and milled at 32 R. P. M. for 16 hours. The product obtained was extracted with water, filtered, and dried as described in Example 1. A soft pigment powder was obtained which was much brighter and stronger than the original crude when ground in a ball mill without salt. The product was very jet in masstone and much redder and 10% stronger in pigment shade than the same crude when acid pasted by the method described in U. S. P. 2,065,928.

*Example 12*

Results similar to those obtained in the above example by ball milling 3:3'-dibromo-indanthrone with salt were also obtained by using sodium sulfate in place of the sodium chloride. The development of strength realized by ball milling 3:3'-dibromo-indanthrone with one of the above inorganic salts was also obtained when indanthrone or monochloro-indanthrone were ball-milled under similar conditions.

*Example 13*

Twenty parts of crude 1,2,5,6-bis-C-phenyl-anthraquinone-dithiazole were mixed with 180 parts of table salt and ground together in a ball mill with 1800 parts steel balls for a period of 48 to 50 hours. The salt-color mixture was separated from the steel balls by screening and then placed in 2000 parts of water. Two hundred parts of a 10% aqueous sodium hypochlorite solution were then added and the whole heated to a temperature of 90–95° C. for three to four hours. The suspended color was then filtered off and the cake washed free of salts.

The press cake thus obtained consisted of 30–32% solids, and part of it was reduced to 20% solids by the addition of water and 1% of the condensation product of formaldehyde with sulfonated naphthalene. The printing strength (using the conventional vat dye printing method) and the dyeing properties of this paste, when applied to textiles by the pigment-pad reduction method or by pigment printing with a binder, were found much superior to pastes of this color, made by acid pasting or vatting methods, described in the prior art. The "double strength" paste (20% solids) made from salt milled material, was much more fluid and superior in working properties to 20% pastes, made by evaporating the filter cakes obtained in the acid pasting or vatting methods, which usually contain only about 10 to 15% solids.

Another portion of the press cake above was dried directly, and gave a product very soft in texture and of much superior pigment strength and shade when used in printing inks, paints, or lacquers, as compared to the powder obtained by drying filter cakes of the above color from acid pasted or vatted material.

It will be noted that the color named in the above example generally demands an alkaline bleaching treatment (sodium hypochlorite) if its full brightness of shade is to be obtained in dyeing or printing. In the process of this invention, this treatment may be joined, as above indicated, in one operation with the aqueous treatment of the salt-ground mass to dissolve out the salt. The economic advantage in this is obvious over the heretofore known acid-pasting or vatting methods, which required isolation of the dyestuff and a re-slurry step prior to treatment with alkaline hypochlorite. Nevertheless, such joinder of treatment is not absolutely required, since the bleaching step may, if desired, be applied after the salt-extraction step, or may be applied to the initial color prior to the grinding operation.

Similar economic consolidation of processes may be practiced generally in the case of other dyestuffs which contain water-soluble impurities as a result of their synthesis. In most cases, such dyestuffs may be subjected to our novel milling process directly in crude form, since purification takes place automatically during the aqueous extraction step after milling. Special agents such as acids, bleaching agents or reducing agents may, if desired, be added in special cases to the extraction water, but still there is the saving of intermediate handling and filtering, and the inevitable attendant loss of color is avoided. Examples 2 and 3 above are illustrations of practical, advantageous application of this consolidated procedure to the manufacture of copper-phthalocyanine. The color there is manufactured by a bake process involving the use of solid, water-soluble diluents. By subjecting the crude bake directly to our process, followed by aqueous extraction in the presence of a small concentration of acid, the color is obtained in highly pure state and improved physical form.

In a similar manner, any crude organic pigment or mixtures of two or more pigments, or water-insoluble textile dye may be treated according to the above examples. In lieu of sodium chloride, various other diluents may be used, provided they are soluble in water, dilute acid, or dilute alkali. The following diluents were used by us in various experiments with satisfactory results: sodium chloride, sodium sulfate (anhydrous, and "Glauber salts"), tri-sodium phosphate, sodium carbonate, ammonium chloride, ammonium sulfate, aluminum sulfate (anhydrous and partially hydrated), sodium-aluminum sulfate, calcium carbonate, sugar and urea. To date, we have not found a water-soluble solid, which is inoperative in this process, provided that it is a substance which is crystalline or brittle and can be milled by attrition to a powder of a particle size of 100 mesh or finer.

Any mill may be used which will give a high shearing stress, e. g., ball mill, roller mill, edge-runner mill, etc. As for the quantity of grinding elements (balls, cyl. pebs., etc.), we have chosen, in the above examples, ratios by weight with respect to total material being ground, corresponding to preferred general practice in the ball-milling art. However, departure from these ratios will not affect our process seriously, provided that the time of grinding is correspondingly adjusted, as is well known in the grinding art.

Many other permissible variations and modifications will be apparent to those skilled in the art.

It will be clear from the above discussion that the process of this invention offers a means of dispersing crude pigments that is more economical in comparison with present known methods. Furthermore, colored pigments, unstable in strong sulfuric acid or in alkaline reducing solutions may be dispersed by this method to produce usuable commercial products. One of the most surprising results of the novel salt-milling procedure is the entire lack of agglomeration in the salt-ground products. Heretofore, it has been necessary to apply special finishing methods to organic pigments in order to obtain them in a physical form suitable for use in printing inks or paints. Many patents has been issued on this phase of the pigment industry. The material obtained from the instant process, due to its lack of agglomeration, dries exceedingly soft. When ground in linseed oil or other paint vehicles, the rate of strength development is far superior to the best soft-textured powders produced by the special finishing methods known to the prior art.

Another advantage, resulting from the surprising physical condition obtained by this process, is the high-solids filter cakes that are obtained. Filter cakes as high as 35% solids have been obtained, whereas acid-pasting or vatting procedures, if carried out under conditions required to produce pigments of high tinctorial quality, rarely produce cakes of over 20% solids. The high-solids cakes of this invention break down to a smooth flowing paste upon the addition of a small amount of water. Free flowing pastes of 20% solids have been obtained by us without the use of aqueous dispersing agents. Such pastes flush much more readily into ink and paint vehicles. Furthermore they produce lakes of much softer texture than in the case where an aqueous dispersing agent is used.

When dealing with certain textile dyes of the vat color class, used for pigment-pad dyeing and printing, the manufacture of an economic color paste of approximately 20% color solids ("double strength" paste) in a form suitable for the above-indicated uses, was heretofore impossible, since known finishing methods did not give satisfactory results. In some cases, for instance the color named in Example 13, very expensive vatting methods have been used in the art to make double strength printing pastes. Superior products at less cost were obtained by using the improved salt-milling method of this invention as illustrated in the above examples.

Altogether, the behavior of organic pigments treated according to this invention is so much different from pigments obtained by the acid-pasting or vatting procedure, that it must be assumed that the pigment particles obtained in this invention possess a distinctive physical form, not obtainable by the other processes. To explain this in absolute terms at this stage is not possible, in view of the inherent speculative nature of any theory advanced in this connection. However, with the understanding that we do not intend to limit our invention thereby, we venture to suggest that the possible explanation for the different behavior above noted may lie in the following considerations.

When a pigment is re-precipitated from sulfuric acid, or from its alkaline vat in the case of a vattable dye, the pigment particles spring into existence from solution. It is logical to assume that at first exceedingly fine, submicroscopic particles are formed but these grow by a process of coalescence. The entire phenomenon is one of crystal growth, and at all stages, therefore, the particles are characterized by a crystalline structure, having plane boundaries or facets. When two particles meet, the surface-active forces between them cause them to adhere at the facets. When the suspension is subsequently dried, the particles remain in contact at a plane surface of minute, but nevertheless finite, area. The cohesive force across this area thus has a finite, and relatively substantial value. As the crystal grows in size, the area of the facets likewise grows. Thus, hard agglomerates are formed which are difficult to break down.

In the process of our invention, however, the pigment is reduced to fine size by attrition from larger particles. The salt or grinding agent, itself being a crystalline substance, breaks down during the process, exposing constantly new, sharp corners which wear down the softer pigment particles. As the process continues, the pigment particles gradually wear down and become rounded in a manner probably not unlike the wearing down of rocks by sand on the sea beach. The result is apparently a rounded, pebble-shaped, pigment particle, and when two such particles meet, their zone of contact is no longer a finite area but a point, or infinitesimal area. The total value of the cohesive force across this point of contact is likewise infinitesimal, and thus either in the wet state or upon subsequent drying there is little force to hold the pigment particles together. It is possible also that the presence of the solid diluent during the grinding procedure has some effect in causing dissipation of the electrostatic, cohesive forces between the particles.

Electron microscope study of our novel products tends to confirm the above theory. When photographed by the aid of an electron microscope, the pigments of this invention appear to consist of non-crystalline, roughly rounded particles of less than 50 millimicrons in either dimension. By contrast, acid pasted material when photographed under the same conditions shows distinctly a crystalline structure, consisting of stubby needles, having a length of about 100 to 200 millimicrons, and having a strong tendency to coalesce into large agglomerates. The finest acid pasted products, produced by the turbulent flow procedure of U. S. P. 2,334,812, are likewise well defined, oblong crystals, of about 100 millimicrons in the longer dimension.

It follows from the above theory that to be successful in our process, the grinding diluent (salt) must beside water-solubility, answer only one qualification. It must not be softer than the pigment being ground. In our experience, all crystalline, water-soluble substances seem to possess inherently this qualification.

In some of the examples above as well as in the claims below reference is made to high rate of color development. This is an expression widely accepted and well understood in the paint and printing-ink art. It refers to the amount of mechanical working that a given pigment requires when incorporated into an oily vehicle before it will bring out a predetermined, major fraction of its ultimate tinctorial strength. The standard apparatus for measuring this work is a three-roll ink mill, the standard vehicle is litho varnish, and the unit for estimating the amount of work required is one pass through said ink mill. If a hard-grinding and a soft-grinding pigment of otherwise equal tinctorial strength are passed repeatedly over the ink mill a very large number of times, a point is eventually reached where further repeated passes do not increase the tinctorial strength of the paste. At this point the paste is said to have reached its "ultimate tinctorial strength." In actual practice it is not economical to work the paste until its ultimate tinctorial strength is developed. Instead, a convenient fraction, say 90%, of the ultimate is assumed as satisfactory, and grinding is discontinued when this point is reached. However, not all pigments will reach the same fraction with equal speed. A hard-grinding pigment may require a dozen passes over the ink mill before it develops 90% of its ultimate tinctorial strength. Such a pigment is generally discarded by the paint-maker as impractical; 6 passes is generally about the highest that an ink- or paint-maker would consider from the viewpoint of economy. As will be seen from Example 1, the products of this invention develop practically full strength (closer to 100% than to 90% of the ultimate strength) with only two passes. In no instance were more than 6 passes required. Our novel products therefore possess not only improved ultimate tinctorial strength, but also a high rate of color development.

We claim:

1. In the process of producing a fine pigment powder by dry-grinding an organic pigment with a water-soluble agent in solid form, the improvement which consists of employing a weight of the agent not less than 4 times the weight of the pigment, and conducting the grinding operation in an apparatus adapted to grind materials by attrition and shearing as distinguished from impact.

2. The process of treating an organic pigment for the purpose of converting it into an improved physical form characterized by its capacity to produce highly concentrated aqueous pastes and to dry from aqueous suspension without producing hard agglomerates, which consists of mixing said pigment with a water-soluble, crystalline compound in solid form, the weight of the water-soluble compound being not less than 4 times the weight of the pigment, subjecting the mixture in dry state to grinding in attrition type apparatus until the desired state of fineness has been attained, and then removing the water-soluble compound by washing the mixture with water.

3. A process as in claim 2, followed by the further step of drying the washed composition to produce a soft pigment powder, characterized by improved dispersibility in oily media.

4. The process of producing a high-solids paste of a vat dyestuff, which consists of mixing the vat dye in solid form with from 4 to 20 times its own weight of dry sodium chloride, subjecting the mixture to dry grinding in a ball mill until the desired state of fineness has been attained, then washing out with water the sodium chloride component of the mixture, and filtering the residual mass without the aid of capillary active agents, to produce a paste of the desired concentration.

5. The process of producing a high-solids paste of a phthalocyanine pigment, which consists of mixing the pigment in dry form with from 4 to 20 times its own weight of dry sodium chloride, subjecting the mixture to dry grinding in an attrition type apparatus until the desired state of fineness has been attained, then washing out with water the sodium chloride component of the mixture, and filtering the residual mass without the aid of capillary active agents, to produce a paste of the desired concentration.

6. The process of converting copper-phthalocyanine into an improved physical form characterized by high tinctorial strength when incorporated into litho-varnish, which consists of mixing dry copper-phthalocyanine with from 4 to 20 times its own weight of dry sodium chloride, subjecting the mixture to dry grinding in a ball mill until a sample of the mixture when washed clean of sodium chloride shows the desired degree of tinctorial strength, washing the ground mixture with water to remove the sodium chloride therefrom, and then filtering the mass without the aid of capillary active agents, whereby a concentrated aqueous paste of the color is obtained.

7. A process of producing copper-phthalocyanine in a highly improved physical form, which comprises subjecting a mixture of phthalonitrile and a chloride of copper to fusion in the presence of a solid, water-soluble diluent, cooling the resulting reaction mass, mixing the same with additional quantities of a water-soluble, crystalline solid to bring the ratio of water-soluble diluent to pigment to a value of at least 4:1; subjecting the mixture in solid form to grinding in an attrition type apparatus until a test sample shows that the desired degree of fineness has been attained, and finally leaching out the water-soluble diluent with water, to isolate the color.

8. A process as defined in claim 6, followed by the step of drying the concentrated aqueous paste, whereby a soft pigment powder is obtained characterized by improved dispersibility in oily media.

JOSEPH WILLIAM LANG.
STANLEY RAWLINGS DETRICK.